United States Patent
Takai et al.

(10) Patent No.: US 8,829,181 B2
(45) Date of Patent: Sep. 9, 2014

(54) PRODUCTION METHOD FOR CATIONIC HYDROXYPROPYL CELLULOSE

(75) Inventors: Masanori Takai, Wakayama (JP); Masafumi Miyamoto, Wakayama (JP); Kohei Nakanishi, Wakayama (JP); Toru Nishioka, Wakayama (JP)

(73) Assignee: KAO Corporation, Tokyo (JP)

( * ) Notice: Subject to any disclaimer, the term of this patent is extended or adjusted under 35 U.S.C. 154(b) by 0 days.

(21) Appl. No.: 13/504,661

(22) PCT Filed: Oct. 29, 2010

(86) PCT No.: PCT/JP2010/069316
§ 371 (c)(1), (2), (4) Date: Apr. 27, 2012

(87) PCT Pub. No.: WO2011/052733
PCT Pub. Date: May 5, 2011

(65) Prior Publication Data
US 2012/0214985 A1   Aug. 23, 2012

(30) Foreign Application Priority Data
Oct. 29, 2009   (JP) ................. 2009-249383

(51) Int. Cl.
*C08B 11/08* (2006.01)
*C08B 11/14* (2006.01)
*C08B 11/193* (2006.01)
*C08B 11/145* (2006.01)
*C08B 11/20* (2006.01)

(52) U.S. Cl.
CPC ............. *C08B 11/145* (2013.01); *C08B 11/08* (2013.01); *C08B 11/193* (2013.01); *C08B 11/20* (2013.01); *C08L 2205/18* (2013.01)
USPC ............. 536/55.3; 536/56; 536/95; 536/55.1; 514/57

(58) Field of Classification Search
USPC .................. 536/55.3, 56, 95, 55.1; 514/57
See application file for complete search history.

(56) References Cited

U.S. PATENT DOCUMENTS 3,472,840 A * 10/1969 Stone et al. .......... 536/43
2010/0105891 A1   4/2010  Norjiri et al.

FOREIGN PATENT DOCUMENTS

| CN | 1789286 A | 6/2006 |
| CN | 1789286 A * | 6/2006 |
| JP | 45 20318 | 7/1970 |
| JP | 54 87787 | 7/1979 |
| JP | 56 62801 | 5/1981 |
| JP | 59 42681 | 10/1984 |
| JP | 2002 114801 | 4/2002 |
| JP | 4160109 | 10/2008 |
| WO | 2009 054373 | 4/2009 |

OTHER PUBLICATIONS

Huang; CN 1789286 A; Jun. 21, 2006 (English Machine Translation).*
International Search Report Issued Dec. 14, 2010 in PCT/JP10/69316 Filed Oct. 29, 2010.

* cited by examiner

*Primary Examiner* — Shaojia Anna Jiang
*Assistant Examiner* — Michael C Henry
(74) *Attorney, Agent, or Firm* — Oblon, Spivak, McClelland, Maier & Neustadt, L.L.P.

(57) ABSTRACT

The present invention relates to a process for producing a cationic hydroxypropyl cellulose including the step of reacting a low-crystalline powdery cellulose with a cationizing agent represented by the following general formula (1) and/or a cationizing agent represented by the following general formula (2), and propylene oxide in the presence of water in an amount of from 10 to 60% by mass on the basis of the low-crystalline powdery cellulose, and a catalyst:

General formula (1)

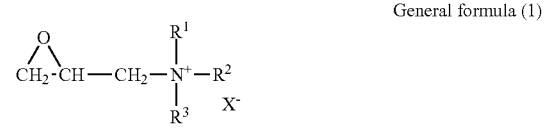

General formula (2)

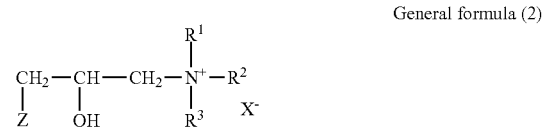

wherein $R^1$ to $R^3$ are each independently a linear or branched hydrocarbon group having 1 to 4 carbon atoms; and X and Z are each a halogen atom and may be the same or different from each other.

14 Claims, No Drawings

PRODUCTION METHOD FOR CATIONIC HYDROXYPROPYL CELLULOSE

CROSS REFERENCES TO RELATED APPLICATIONS

This application is a 371 of International Patent Application No. PCT/JP 10/69316, filed on Oct. 29, 2010, and claims priority to Japanese Patent Application No. 2009-249383, filed on Oct. 29, 2009.

FIELD OF THE INVENTION

The present invention relates to a process for producing a cationic hydroxypropyl cellulose useful as cationic cellulose derivatives.

BACKGROUND OF THE INVENTION

Cationic cellulose derivatives including cationic hydroxyalkyl celluloses have been used in a variety of applications including components to be compounded in cleaning agent compositions such as shampoos, rinses, treatments and conditioners, dispersants, modifiers and aggregating agents, etc.

As the method for production of the cationic hydroxyalkyl celluloses, Patent Documents 1 and 2 disclose the production method in which a hydroxyalkyl cellulose in the form of a slurry is cationized with a cationizing agent such as a glycidyl trialkyl ammonium salt.

In addition, Patent Document 3 discloses the method in which a cellulose ether in the form of not a slurry but a powder is subjected to a reaction for production of a derivative thereof in the presence of a reduced amount of a solvent to thereby enhance not only a productivity owing to reduction in amount of the solvent used but also a reaction efficiency of the reaction agent.

Further, Patent Document 4 discloses the method of producing a hydroxypropyl cellulose in which a low-crystalline powdery cellulose is reacted with propylene oxide in the presence of a catalyst.

Patent Document 1: JP 45-20318B
Patent Document 2: JP 59-42681B
Patent Document 3: JP 2002-114801A
Patent Document 4: JP 2009-143997A

SUMMARY OF THE INVENTION

The present invention relates to a process for producing a cationic hydroxypropyl cellulose having an excellent water solubility with a high productivity.

The present inventors have made extensive studies on production of the cationic hydroxypropyl cellulose according to the methods described in Patent Documents 3 and 4, and as a result, have found that by limiting a water content in the reaction system to a specific range, the reaction can proceed in an efficient manner to thereby produce a cationic hydroxypropyl cellulose having an excellent water solubility.

Thus, the present invention relates to a process for producing a cationic hydroxypropyl cellulose including the step of reacting a low-crystalline powdery cellulose with a cationizing agent represented by the following general formula (1) and/or a cationizing agent represented by the following general formula (2), and propylene oxide in the presence of water in an amount of from 10 to 60% by mass on the basis of the low-crystalline powdery cellulose, and a catalyst:

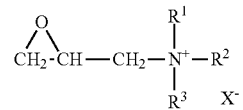

General formula (1)

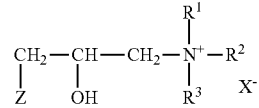

General formula (2)

wherein $R^1$ to $R^3$ are each independently a linear or branched hydrocarbon group having 1 to 4 carbon atoms; and X and Z are each a halogen atom and may be the same or different from each other.

Effect of the Invention

In accordance with the present invention, the cationic hydroxypropyl cellulose having a high water solubility can be produced with a high productivity and a high reaction efficiency.

DETAILED DESCRIPTION OF THE INVENTION

Low-Crystalline Powdery Cellulose

It is generally known that celluloses have several crystal structures in which an amorphous moiety and a crystalline moiety are allowed to coexist. Even generally known powdery celluloses contain an amorphous moiety in a very small amount. And the degree of crystallinity of the celluloses is numerically expressed by a crystallinity index number obtained by substituting the values determined from powder X-ray crystal diffraction spectrum analysis for corresponding items of the following calculation formula (1);

$$\text{Crystallinity Index Number} = [(I_{22.6} - I_{18.5})/I_{22.6}] \qquad (1)$$

wherein $I_{22.6}$ is a diffraction intensity of a lattice plane (002 plane) as measured at a diffraction angle $2\theta$ of 22.6° in X-ray diffraction analysis; and $I_{18.5}$ is a diffraction intensity of an amorphous moiety as measured at a diffraction angle $2\theta$ of 18.5° in X-ray diffraction analysis.

The above crystallinity index number is expressed by using, as an indication, a change in X-ray diffraction intensity on a 002 plane of an I-type crystal of a cellulose due to a change from a crystalline state to an amorphous state. Therefore, if all of crystals in the cellulose have only an I-type crystal form, the crystallinity index number thereof theoretically falls within the range of from 0 to 1. However, actually, a plurality of crystal forms are present in the cellulose. Thus, in the case where the crystals other than the I-type crystals are broken and amorphized to a sufficient extent, the crystallinity index number might become a negative value.

Generally known powdery celluloses are classified into so-called crystalline celluloses having a crystallinity index number of about 0.6 to about 0.8, and therefore exhibit an extremely low reactivity for synthesis of a cellulose ether. The term "low-crystalline" of the low-crystalline powdery cellulose as used in the present invention means the condition in which the proportion of the amorphous moiety in a crystal structure of the cellulose is large. From the viewpoint of a high reactivity, the crystallinity index number of the low-crystalline powdery cellulose is preferably in the range of from −0.3 to 0.5, more preferably from −0.3 to 0.3 and still more preferably from −0.3 to 0.

The low-crystalline powdery cellulose used in the present invention (hereinafter occasionally referred to merely as a "raw cellulose") can be readily produced from cellulose-containing raw materials such as sheet-like or roll-like pulps having a high cellulose purity as generally available raw materials. The method for producing the low-crystalline powdery cellulose is not particularly limited, and the low-crystalline powdery cellulose may be readily produced, for example, by the production method described in JP 4160109B in which chip-like pulps obtained by coarsely crushing sheet-like cellulose pulps are treated by an extruder and further by a mill such as a ball mill. In the production method, it is possible to produce a powdery cellulose having a high molecular weight, i.e., a high polymerization degree and a low crystallinity.

The extruder used in the above production method may be either a single-screw or twin-screw extruder and may be equipped with so-called kneading disks in any portion of screws thereof for the purpose of applying a strong compression shear force to the pulps. The method of treating the pulps by the extruder is not particularly limited. The chip-like pulps are preferably continuously charged into the extruder and treated therein.

Examples of the mill such as a ball mill which may be used in the above production method include known ball mills such as a vibration ball mill, a medium-stirring ball mill, a rolling ball mill and a planetary ball mill, as well as a rod mill. The material of balls or rods, etc., used as a milling medium in these mills is not particularly limited. Examples of the material of balls or rods, etc., include iron, stainless steel, alumina and zirconia. The outer diameter of the milling medium such as balls and rods is preferably from 0.1 to 100 mm, more preferably from 0.5 to 50 mm and still more preferably from 1 to 30 mm from the viewpoint of efficient amorphization of the cellulose. As the milling medium, there may also be used those having a tubular shape. The filling percentage of the milling medium such as balls and rods in the mills may vary depending upon the kinds of mills used, and is usually from 10 to 97% by volume, and preferably from 20 to 90% by volume from the viewpoint of a high milling efficiency. Meanwhile, the "filling percentage" as used herein means a ratio of an apparent volume of the milling medium to a capacity of a stirring portion of the mill.

The milling treatment time of the cellulose in the ball mills, etc., is preferably from 5 min to 72 h and more preferably from 5 min to 50 h to efficiently reduce a crystallinity index number of the cellulose. The milling treatment is preferably carried out at a temperature of from 5 to 250° C. and more preferably from 5 to 200° C. to minimize degradation or deterioration of the cellulose due to heat generated upon the treatment. If required, the milling treatment is preferably conducted in an atmosphere of an inert gas such as nitrogen.

The polymerization degree of the raw cellulose used in the present invention is preferably from 100 to 2000 and more preferably from 100 to 1000 from the viewpoint of a good availability of the raw pulps and easiness of handling upon industrial practice.

The average particle size of the raw cellulose used in the present invention is not particularly limited as long as a good fluidity of the powdery cellulose can be ensured, and is preferably 300 μm or less, more preferably 150 μm or less and still more preferably 75 μm or less. However, from the viewpoint of easiness of handling upon industrial practice, the average particle size of the raw cellulose is preferably 20 μm or more, and more preferably 25 μm or more.

<Reaction with Cationizing Agent and Propylene Oxide>

In the production process of the present invention, the raw cellulose is reacted with a cationizing agent and propylene oxide under the specific conditions. The reactions of the raw cellulose with the cationizing agent and with propylene oxide may be carried out either simultaneously or separately from each other. From the viewpoint of well controlling amounts of the individual components introduced, the reactions are preferably carried out separately from each other. From the viewpoint of a high reaction efficiency, more preferably, the raw cellulose is first reacted with the cationizing agent, and then reacted with propylene oxide.

In the following, the reaction with the cationizing agent (hereinafter occasionally referred to merely as a "cationization reaction") and the reaction with propylene oxide (hereinafter occasionally referred to merely as a "hydroxypropylation reaction") are separately explained. In the following descriptions, the cellulose subjected to the cationization reaction is also referred to as a "cationic cellulose", whereas the cellulose subjected to the hydroxypropylation reaction is also referred to as "hydroxypropyl cellulose (HPC)".

[Cationization Reaction]
(Cationizing Agent)

The cationizing agent used in the present invention includes a compound represented by the above general formula (1) and/or a compound represented by the above general formula (2).

In the general formulae (1) and (2), $R^1$ to $R^3$ are each independently a linear or branched hydrocarbon group having 1 to 4 carbon atoms. From the viewpoint of a high water solubility of the cationic hydroxypropyl cellulose produced by the process of the present invention (hereinafter occasionally referred to merely as "C-HPC"), preferred hydrocarbon groups as $R^1$ to $R^3$ are a methyl group and an ethyl group, and more preferred is a methyl group. X represents a halogen atom. Specific examples of the halogen atom as X include chlorine, bromine and iodine. Among these halogen atoms, from the viewpoint of a high water solubility of the C-HPC produced by the process of the present invention, preferred are chlorine and bromine, and more preferred is chlorine. In the general formula (2), Z also represents a halogen atom, and may be the same as or different from X. From the same viewpoint as describe above, among these halogen atoms, preferred are chlorine and bromine, and more preferred is chlorine. Among the cationizing agents, the compounds represented by the general formula (1) are preferably used because they hardly suffer from formation of salts thereof upon the reaction.

Specific examples of the compounds represented by the above general formulae (1) and (2) include chlorides, bromides and iodides of glycidyl trimethyl ammonium, glycidyl triethyl ammonium and glycidyl tripropyl ammonium; chlorides of 3-chloro-2-hydroxypropyl trimethyl ammonium, 3-chloro-2-hydroxypropyl triethyl ammonium and 3-chloro-2-hydroxypropyl tripropyl ammonium; bromides of 3-bromo-2-hydroxypropyl trimethyl ammonium, 3-bromo-2-hydroxypropyl triethyl ammonium and 3-bromo-2-hydroxypropyl tripropyl ammonium; and iodides of 3-iodo-2-hydroxypropyl trimethyl ammonium, 3-iodo-2-hydroxypropyl triethyl ammonium and 3-iodo-2-hydroxypropyl tripropyl ammonium.

Among these compounds represented by the above general formulae (1) and (2), preferred are chlorides and bromides of glycidyl trimethyl ammonium and glycidyl triethyl ammonium, chlorides of 3-chloro-2-hydroxypropyl trimethyl ammonium and 3-chloro-2-hydroxypropyl triethyl ammonium, and bromides of 3-bromo-2-hydroxypropyl trimethyl ammonium and 3-bromo-2-hydroxypropyl triethyl ammonium; more preferred are glycidyl trimethyl ammonium chloride and 3-chloro-2-hydroxypropyl trimethyl ammonium chloride; and still more preferred is glycidyl trimethyl ammonium chloride.

These cationizing agents may be used alone or in combination of any two or more thereof.

When reacting these cationizing agents with the raw cellulose or with HPC, a quaternary ammonium salt-substituted propyleneoxy group represented by the following general formula (3) or (4) (hereinafter occasionally referred to merely as a "cationic group") can be introduced into the cellulose or HPC.

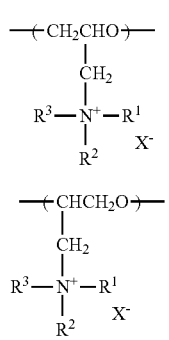

General formula (3)

General formula (4)

In the above general formulae (3) and (4), $R^1$ to $R^3$ and X have the same meanings as those defined in the above-mentioned general formulae (1) and (2).

The cationic group may be substituted for hydrogen atoms of a part or whole of hydroxyl groups of the raw cellulose or the HPC of the present invention, or may be substituted for hydrogen atoms of terminal hydroxyl groups of the cationic group already bonded to the raw cellulose or the HPC of the present invention. In the general formula (3) or (4), an oxygen atom of the quaternary ammonium salt-substituted propyleneoxy group being present at a terminal end thereof is bonded with a hydrogen atom to form a hydroxyl group.

The average molar number of addition of the cationic group introduced into the raw cellulose or the HPC of the present invention per 1 mol of a constitutional anhydroglucose unit contained in a main chain of the cellulose (hereinafter occasionally referred to merely as a "cationic group substitution degree") is preferably from 0.01 to 2.5, more preferably from 0.02 to 1, still more preferably from 0.03 to 0.6 and further more preferably from 0.05 to 0.4 from the viewpoint of a good performance of the C-HPC obtained according to the production process of the present invention.

The amount of the cationizing agent used may be appropriately controlled such that the cationic group substitution degree falls within the above-specified range, and is preferably from 0.01 to 10 mol, more preferably from 0.02 to 4 mol, still more preferably from 0.03 to 2.5 mol and further more preferably from 0.05 to 1 mol per 1 mol of a constitutional anhydroglucose unit contained in a molecule of the raw cellulose or the HPC of the present invention.

When using the cationizing agent in the present invention, the cationizing agent having a high purity may be directly added to the reaction system. Alternatively, from the viewpoint of a good handling property, the cationizing agent may be added in the form of a solution prepared by dissolving the cationizing agent in a solvent such as water.

The cationizing agent may be added to the reaction system either at one time, intermittently in divided parts, continuously, or in combination of these addition methods. In order to uniformly disperse the cationizing agent in the raw cellulose or the HPC of the present invention to react therewith, the cationizing agent is preferably added to the reaction system either intermittently in divided parts or continuously while stirring the raw cellulose or the HPC of the present invention.

(Catalyst)

The catalyst used in the cationization reaction may be either a base catalyst or an acid catalyst.

Examples of the base catalyst include alkali metal hydroxides such as sodium hydroxide, potassium hydroxide and lithium hydroxide, alkali earth metal hydroxides such as magnesium hydroxide and calcium hydroxide, and tertiary amines such as trimethylamine, triethylamine and triethylene diamine. Examples of the acid catalyst include Lewis acid catalysts such as lanthanide triflates.

Among these catalysts, from the viewpoint of less occurrence of deterioration in polymerization degree of the cellulose, preferred are base catalysts, more preferred are alkali metal hydroxides, and still more preferred are sodium hydroxide and potassium hydroxide. These catalysts may be used alone or in combination of any two or more thereof.

In the reaction of the present invention, it is sufficient that the catalyst is used in a catalytic amount on the basis of both the raw cellulose or the HPC of the present invention and the cationizing agent. More specifically, the catalyst is preferably used in an amount of from 0.1 to 50 mol %, more preferably from 1 to 30 mol % and still more preferably from 5 to 25 mol % on the basis of a constitutional anhydroglucose unit contained in a molecule of the raw cellulose or the HPC of the present invention.

When using the compound represented by the above general formula (2) as the cationizing agent, a stoichiometric amount of a hydrogen halogenide is produced. Therefore, when using a base catalyst as the catalyst, the base catalyst is preferably added in an amount of a sum of the above catalytic amount and its stoichiometric amount based on the cationizing agent.

The catalyst may be added directly in the form of a high-purity catalyst or may be added in the form of a solution prepared by dissolving the catalyst in a solvent such as water.

Also, the catalyst may be added to the reaction system either at one time, intermittently in divided parts, continuously, or in combination of these addition methods. Among these addition methods, in order to uniformly disperse the catalyst in the raw cellulose or the HPC of the present invention to react therewith, the catalyst is preferably added to the reaction system either intermittently in divided parts or continuously while stirring the raw cellulose or the HPC of the present invention.

In addition, when carrying out the hydroxypropylation reaction prior to the cationization reaction, the catalyst used in the hydroxypropylation reaction may be used as such in the cationization reaction without need of neutralization or removal of the catalyst, etc., after completion of the hydroxypropylation reaction. In view of avoiding the increase in burdens on purification treatment owing to formation of salts, the catalyst used in the hydroxypropylation reaction is preferably used as such in the subsequent cationization reaction.

(Water Content)

In the production process of the present invention, it is important to well control a water content in the reaction system upon the cationization reaction. The water content upon the reaction gives an influence on a rate of the reaction. When the reaction is carried out in the presence of water in an amount of 10% by mass or more on the basis of the raw cellulose used therein or on the basis of the raw cellulose used in the hydroxypropylation reaction in the case of using the HPC of the present invention as the raw material of the cationization reaction, the cationization reaction can proceed rapidly. On the other hand, the water content upon the reaction also gives an influence on a water solubility of the C-HPC obtained by the production process of the present invention. When the water content upon the cationization reaction is 60% by mass or less on the basis of the raw cellulose used therein or on the basis of the raw cellulose used in the hydroxypropylation reaction in the case of using the HPC of the present invention as the raw material of the cationization reaction, the C-HPC obtained by the production process of the present invention can exhibit a good water solubility.

The water content in the reaction system upon the cationization reaction is preferably from 12 to 50% by mass and more preferably from 15 to 30% by mass from the above viewpoints.

When the catalyst and/or the cationizing agent are used in the form of an aqueous solution and the water content in the reaction system upon initiation of the reaction exceeds the above-specified range, it is required that the water content is adjusted to fall within the above-specified range by conducting an ordinary dehydration procedure such as pressure reduction, heating, etc. The dehydration procedure may be carried out either after completion of introducing the catalyst aqueous solution and/or cationizing agent aqueous solution into the reaction vessel, or simultaneously with introduction of these aqueous solutions into the reaction vessel.

(Non-Aqueous Solvent)

The cationization reaction may proceed without any non-aqueous solvent other than water. However, for the purpose of uniformly dispersing the cationizing agent or the catalyst, the cationization reaction may also be carried out in the presence of the non-aqueous solvent together with water.

The amount of the non-aqueous solvent used in the cationization reaction is preferably from 0 to 40% by mass on the basis of the raw cellulose used therein or on the basis of the raw cellulose used in the hydroxypropylation reaction in the case of using the HPC of the present invention as the raw material of the cationization reaction. When using the non-aqueous solvent in the above-specified amount, not only a good productivity can be attained, but also the raw cellulose or the HPC of the present invention can be maintained in a powdered state. As a result, the reaction system can be stirred efficiently to conduct the reaction uniformly, and decomposition of the cationizing agent or side reactions of the cationizing agent with the non-aqueous solvent can be suppressed so that the cationization reaction can be allowed to proceed in an efficient manner. From these viewpoints, the amount of the non-aqueous solvent used in the cationization reaction is more preferably from 0 to 30% by mass and still more preferably from 0 to 20% by mass.

The non-aqueous solvent used in the cationization reaction is not particularly limited, and is preferably a polar solvent. Examples of the polar solvent include alcohols having 1 to 5 carbon atoms such as isopropanol, isobutanol and tert-butanol; ether solvents such as 1,4-dioxane, ethylene glycol dimethyl ether, diethylene glycol dimethyl ether and triethylene glycol dimethyl ether; and aprotic polar solvents such as dimethyl sulfoxide and dimethyl formamide. Among these non-aqueous solvents, from the viewpoint of suppressing undesirable side reactions with the cationizing agent, preferred are secondary or tertiary alcohols having 3 to 5 carbon atoms, ether solvents and aprotic polar solvents.

These non-aqueous solvents may be used alone or in the form of a mixture of any two or more thereof.

The kind, amount and preferred configuration of the non-aqueous solvent used in the cationization reaction may be the same as those used in the below-mentioned hydroxypropylation reaction. Therefore, if the hydroxypropylation reaction is conducted prior to the cationization reaction, the non-aqueous solvent being present after completion of the hydroxypropylation reaction may also be directly used as the non-aqueous solvent for the cationization reaction without need of any removal or addition of the non-aqueous solvent.

(Reaction Apparatus)

The reaction apparatus used in the cationization reaction is preferably an apparatus capable of mixing the raw cellulose or the HPC of the present invention both being in the form of a powder, the catalyst and the cationizing agent with each other as uniformly as possible. Specific examples of such a reaction apparatus include mixing devices such as a mixer, a loedige mixer, a high speed mixer and a vertical granulator, and other mixing devices used for kneading resins, etc., as described in the paragraph [0016] of JP 2002-114801A such as a co-called kneader. Among these mixing devices, more preferred are a loedige mixer and a kneader-type reaction apparatus.

(Reaction Procedures and Reaction Conditions)

In the cationization reaction, the order of addition of the raw cellulose or HPC, the cationizing agent and the catalyst as well as, if required, water and/or the non-aqueous solvent is not particularly limited. However, the following order of addition of the respective components is preferred. That is, the catalyst is added, if required, together with water and/or the non-aqueous solvent, to the raw cellulose or the HPC of the present invention, followed by intimately stirring and mixing these components to uniformly disperse the catalyst therein, and then the cationizing agent is added to and mixed with the resulting mixture.

The reaction temperature used in the cationization reaction is preferably in the range of from 0 to 100° C., more preferably from 20 to 90° C. and still more preferably from 40 to 80° C. from the viewpoints of a high reaction rate, and suppression of decomposition of the cationizing agent and coloration of C-HPC produced according to the process of the present invention.

In addition, from the viewpoint of suppression of coloration upon the reaction, the cationization reaction is preferably carried out in an atmosphere of an inert gas such as nitrogen.

After completion of the cationization reaction, the reaction product may be subjected, if required, to a purification treatment such as neutralization of the catalyst, and washing with a solvent such as hydrous isopropanol and hydrous acetone, etc., to thereby isolate the cationic cellulose or C-HPC. In the case where the hydroxypropylation reaction is conducted after the cationization reaction, since the catalyst and the non-aqueous solvent may be common to the cationization reaction and the hydroxypropylation reaction, neutralization of the catalyst as well as purification and removal of the catalyst and the solvent may be omitted for the purpose of simplifying the production process, and the hydroxypropylation reaction may be directly performed sequentially after the preceding cationization reaction.

[Hydroxypropylation Reaction]

In the hydroxypropylation reaction, the raw cellulose or the cationic cellulose of the present invention is reacted with propylene oxide to introduce a propyleneoxy group represented by the following general formula (5) or (6) into the raw cellulose or the cationic cellulose of the present invention. The propyleneoxy group represented by the following general formula (5) or (6) may be substituted for hydrogen atoms in a part or whole of hydroxyl groups of the raw cellulose or the cationic cellulose, or may be substituted for hydrogen atoms in terminal hydroxyl group of the propyleneoxy group already bonded to the raw cellulose or the cationic cellulose.

In the following general formula (5) or (6), the oxygen atom being present at a terminal end of the propyleneoxy group is bonded to a hydrogen atom to form a hydroxyl group.

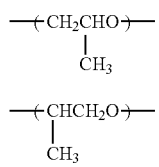

General formula (5)

General formula (6)

The average molar number of addition of the propyleneoxy group represented by the above general formula (5) or (6) which is introduced into the raw cellulose or the cationic cellulose by the above hydroxypropylation reaction per 1 mol of a constitutional anhydroglucose unit in a main chain of the cellulose (hereinafter occasionally referred to as a "propyleneoxy group substitution degree") is preferably from 0.1 to 5, more preferably from 0.5 to 4 and still more preferably from 0.8 to 3 from the viewpoints of introducing the propyleneoxy group into the raw cellulose or the cationic cellulose in an amount sufficient to exhibit a good performance thereof.

The amount of the propylene oxide used in the hydroxypropylation reaction may be appropriately controlled according to the propyleneoxy group substitution degree as desired. However, from the viewpoint of a good performance of the C-HPC obtained according to the production process of the present invention, the amount of the propylene oxide used in the hydroxypropylation reaction is preferably from 0.1 to 12 mol, more preferably from 0.5 to 10 mol and still more preferably from 1 to 7 mol per 1 mol of a constitutional anhydroglucose unit in a molecule of the raw cellulose or the cationic cellulose of the present invention.

The configuration of the propylene oxide upon addition thereof may be in the form of a solution prepared by dissolving the propylene oxide in an organic solvent, etc., from the viewpoint of a good handling property. However, the propylene oxide is kept in a liquid state under the conditions of the hydroxypropylation reaction, and therefore preferably added as such.

The propylene oxide may be added either at one time, intermittently in divided parts, continuously, or in combination of these addition methods. In order to uniformly disperse the propylene oxide in the raw cellulose or the cationic cellulose of the present invention to react therewith, the propylene oxide is preferably added to the reaction system either intermittently in divided parts or continuously while stirring the raw cellulose or the cationic cellulose of the present invention.

(Catalyst)

The kind, shape, addition method and preferred configuration of the catalyst used in the hydroxypropylation reaction are respectively the same as those used in the cationization reaction.

In the hydroxypropylation reaction of the present invention, it is sufficient that the catalyst is used in a catalytic amount on the basis of both the raw cellulose or the cationic cellulose of the present invention and the propylene oxide. More specifically, the catalyst is preferably used in an amount of from 0.1 to 50 mol %, more preferably from 1 to 30 mol % and still more preferably from 5 to 25 mol % on the basis of a constitutional anhydroglucose unit contained in a molecule of the raw cellulose or the cationic cellulose of the present invention.

As described above, in the case where the cationization reaction is conducted prior to the hydroxypropylation reaction and in the case where neutralization and removal of the catalyst are not conducted after completion of the cationization reaction, it is possible to conduct the hydroxypropylation reaction without adding an additional amount of the catalyst.

(Water Content)

The water content upon the hydroxypropylation reaction also gives an influence on a rate of the reaction as well as a water solubility of C-HPC produced according to the process of the present invention similarly to the water content upon the cationization reaction. Therefore, it is also important to control the water content upon the hydroxypropylation reaction. When the water content upon the hydroxypropylation reaction is adjusted to from 10 to 60% by mass on the basis of the raw cellulose used therein or on the basis of the raw cellulose used upon the cationization reaction in the case of using the cationized cellulose of the present invention as the raw material of the hydroxypropylation reaction, the hydroxypropylation reaction can proceed rapidly, and the C-HPC produced by the process of the present invention can exhibit a good water solubility.

From these viewpoints, the water content in the reaction system upon the hydroxypropylation reaction is preferably from 12 to 50% by mass and more preferably from 15 to 30% by mass.

When the catalyst and/or the propylene oxide are used in the form of an aqueous solution and the water content in the reaction system upon initiation of the reaction exceeds the above-specified range, it is required that the water content is adjusted to lie within the above-specified range by conducting an ordinary dehydration procedure including pressure reduction, heating, etc. The dehydration procedure may be carried out either after completion of introducing the catalyst aqueous solution and/or propylene oxide aqueous solution into the reaction vessel, or simultaneously with introduction of these aqueous solutions into the reaction vessel.

(Non-Aqueous Solvent)

The hydroxypropylation reaction may be allowed to proceed without using any non-aqueous solvent other than water. However, for the purpose of uniformly dispersing the propylene oxide or the catalyst, the hydroxypropylation reaction may also be carried out in the presence of the non-aqueous solvent together with water.

The kind and preferred configuration of the non-aqueous solvent used in the hydroxypropylation reaction are the same as those used in the cationization reaction.

The amount of the non-aqueous solvent used in the hydroxypropylation reaction is preferably from 0 to 40% by mass on the basis of the raw cellulose used therein or on the basis of the raw cellulose used in the cationization reaction in the case of using the cationized cellulose of the present invention as the raw material of the hydroxypropylation reaction. When using the non-aqueous solvent in the above-specified amount, not only a good productivity can be attained, but also the raw cellulose or the cationized cellulose of the present invention can be maintained in a powdered state. As a result, the reaction system can be stirred efficiently to conduct the reaction uniformly, and decomposition of the propylene oxide or side reactions of the propylene oxide with the non-aqueous solvent can be suppressed so that the hydroxypropylation reaction can be allowed to proceed in an efficient manner. From these viewpoints, the amount of the non-aqueous solvent used in the hydroxypropylation reaction is more preferably from 0 to 30% by mass and still more preferably from 0 to 20% by mass.

The kind, amount and preferred configuration of the non-aqueous solvent used in the hydroxypropylation reaction are respectively the same as those used in the above-mentioned cationization reaction. Therefore, if the cationization reaction is conducted prior to the hydroxypropylation reaction, the non-aqueous solvent being present after completion of the cationization reaction may be directly used as the non-aqueous solvent for the hydroxypropylation reaction without need of any removal or addition of the non-aqueous solvent.

(Reaction Apparatus)

The preferred configuration of the reaction apparatus used in the hydroxypropylation reaction is the same as that used in the cationization reaction except that the cationic cellulose of the present invention may be used therein as the raw material in place of the HPC of the present invention.

(Reaction Procedures and Reaction Conditions)

In the hydroxypropylation reaction, the order of addition of the raw materials, reaction temperature, washing and purification treatments after the reaction, and preferred configurations thereof, are respectively the same as those used in the cationization reaction except that the propylene oxide is used in place of the cationizing agent.

In addition, from the viewpoint of suppressing undesirable coloration upon the reaction, the hydroxypropylation reaction is preferably carried out in an atmosphere of an inert gas such as nitrogen.

<Application Fields of Cationic Hydroxypropyl Cellulose>

In accordance with the production process of the present invention, it is possible to introduce a cationic group and a propyleneoxy group into the raw cellulose with a desired substitution degree, and produce a cationic hydroxypropyl cellulose having an excellent water solubility. Therefore, the cationic hydroxypropyl cellulose obtained according to the present invention can be extensively used in the applications such as components to be compounded in cleaning agent compositions such as shampoos, rinses, treatments and conditioners, as well as in the applications such as dispersants, modifiers and aggregating agents.

EXAMPLES

In the following, "%" as used herein means "% by mass" unless otherwise specified. The measuring methods used in the following Examples and Comparative Examples are described in detail below.

(1) Measurement of Water Content

The water content was measured at 120° C. using an infrared moisture balance "FD-610" available from Kett Electric Laboratory.

(2) Calculation of Crystallinity Index Number

The crystallinity index number of 1-type crystals of a cellulose was determined as follow. That is, an X-ray diffraction intensity of a sample was measured using a "Rigaku RINT 2500VC X-RAY diffractometer" available from Rigaku Corporation, under the following conditions to calculate a crystallinity index number of the sample according to the above calculation formula (1).

Measuring Conditions:

X-ray source: Cu/Kα-radiation; tube voltage: 40 kV; tube current: 120 mA; measuring range: diffraction angle 2θ=5 to 45'; X-ray scanning speed: 10°/min. The sample to be measured was prepared by compressing pellets each having an area of 320 mm² and a thickness of 1 mm.

(3) Measurement of Average Polymerization Degree of Cellulose:

Copper-Ammonia Method (Preparation of Solution)

A measuring flask (100 mL) was charged with 0.5 g of cuprous chloride and 20 to 30 mL of 25% aqueous ammonia, and after completely dissolving the contents of the flask, 1.0 g of cupric hydroxide and 25% aqueous ammonia were added to the resulting solution such that the flask was filled therewith just before reaching a marked line of the flask. The contents of the flask were stirred for 30 to 40 min and thereby completely dissolved. To the resulting solution were added 20 to 500 mg of a cellulose as a sample to be measured, and then the aqueous ammonia was filled in the flask until reaching the marked line. The flask was hermetically sealed, and the contents of the flask were stirred for 12 h using a magnetic stirrer and thereby dissolved. The measuring sample used was dried under reduced pressure at 105° C. for 3 h to calculate a solid content thereof.

(Measurement by Viscometer)

The resulting copper-ammonia aqueous solution was filled in an Ubbelohde viscometer "VISCOMETER" (product name) available from Kusano Science Corporation, and after the viscometer filled with the solution was allowed to stand in a constant temperature oven (20±0.1° C.) for 1 h, a falling velocity of the solution was measured. The copper-ammonia solutions having various sample concentrations (g/L) were measured for their falling velocity (t (sec)), and a copper-ammonia solution containing no sample was also measured for its falling velocity ($t_0$ (sec)). From the thus measured values, a relative viscosity (TO of the sample was calculated according to the following formula.

$$\eta_r = t/t_0$$

Next, a reduced viscosity ($\eta_{sp}/c$) of the sample at the respective concentrations was calculated according to the following formula.

$$\eta_{sp}/c = (\eta_r - 1)/c$$

wherein c is a sample concentration (g/dL).

In addition, the reduced viscosity was extrapolated at c=0 to determine an intrinsic viscosity [η] thereof, and the viscosity-average polymerization degree (DP) was calculated according to the following formula.

$$DP = 2000 \times [\eta]$$

(4) Measurement of Average Particle Size

The average particle size was measured using a laser diffraction/scattering-type particle size distribution measuring device "LA-920" available from Horiba, Ltd. The measuring conditions were as follow. That is, the sample was subjected to ultrasonic treatment for 1 min before measuring a particle size thereof, and water was used as a dispersing medium upon the measurement to measure a median diameter based on a volume thereof at a temperature of 25° C.

(5) Calculation of Amount of Substituent Group Introduced

[Substitution Degree of Cationic Group]

The substitution degree of the cationic group was determined from a chlorine element content obtained by elemental analysis of the sample.

[Substitution Degree of Propyleneoxy Group]

The substitution degree of the propyleneoxy group was determined by the method for analysis of hydroxypropyl cellulose as described in the Japanese Pharmacopoeia except that no hydroxypropyl cellulose was used as an objective to be analyzed.

(6) Calculation of Water Soluble Content

The sample was weighed in an amount of 1.00 g and placed in a 100 mL measuring flask, and after adding ion-exchanged water into the flask, the contents of the flask were stirred for 12 h using a magnetic stirrer and dissolved. Then, 50 mL of the resulting solution were transferred into a centrifugal precipitation tube and subjected therein to centrifugal separation at 3000 rpm (2000×g) for 20 min. Ten milliliters of the thus separated supernatant liquid were dried under reduced pressure (105° C.; 3 h) to obtain solid components, and the water soluble content in the sample was calculated according to the following formula.

Water Soluble Content (%)=[(mass (g) of solid components in 10 mL of supernatant liquid)×10/(mass of sample)]×100

Production Example 1

Production of Low-Crystalline Powdery Cellulose

A sheet-like wood pulp (available from Borregaard Inc.; crystallinity index number: 0.74; water content: 7%) was cut into chips using a shredder "MSX2000-IVP440F" available from Meiko Shokai Co., Ltd.

Then, the thus obtained pulp chips were charged into a twin-screw extruder "EA-20" available from Suehiro EPM Corporation, at a feed rate of 2 kg/h and passed through the extruder one time at shear rate of 660 sec$^{-1}$ and a screw rotating speed of 300 rpm while flowing a cooling water from outside therethrough to obtain a powder.

Next, 100 g of the thus obtained powdery cellulose (water content: 7%) were charged into a batch-type medium-stirring mill "ATTRITOR MA01D" available from Nippon Coke & Engineering Co., Ltd., having a container capacity of 800 mL which was filled with 1440 g of SUS304 balls of ¼ inches in diameter at a filling ratio of 23% and fitted with an agitation blade having a diameter of 65 mm. While flowing a cooling water through a jacket of the container, the powdery cellulose was pulverized at a stirring speed of 555 rpm and a temperature of from 30 to 70° C. for 7 h, thereby obtaining a low-crystalline powdery cellulose (crystallinity index number: −0.15; polymerization degree: 556; average particle size: 30 μm; water content: 7%).

Production Example 2

Production of Low-Crystalline Powdery Cellulose

A sheet-like wood pulp (available from Tembec Inc.; crystallinity index number: 0.76; water content: 7%) was cut into chips using a shredder "MSX2000-IVP440F" available from Meiko Shokai Co., Ltd. Then, the thus obtained pulp chips were dried under reduced pressure at 50° C. for 12 h, thereby obtaining a chip-like dry pulp (water content: 0.4%).

Next, 100 g of the thus obtained chip-like dry pulp were charged into a batch-type vibration mill "MB-1" available from Chuo Kakohki Co., Ltd., having a total container capacity of 3.5 L which was filled with thirteen SUS304 rods of 30 mm in diameter and a length of 218 mm having a circular shape in section at a filling ratio of 57%. The chip-like dry pulp was pulverized in the vibration mill at a frequency of 20 Hz and a total amplitude of 8 mm at a temperature of from 30 to 70° C. for 1 h, thereby obtaining a low-crystalline powdery cellulose (crystallinity index number: −0.20; polymerization degree: 740; average particle size: 52 μm; water content: 1%).

Production Example 3

Production of Low-Crystalline Powdery Cellulose

The same procedure as in Production Example 2 was repeated except that the cut pulp chips were subjected to no drying treatment under reduced pressure at 50° C., thereby obtaining a low-crystalline powdery cellulose (crystallinity index number: 0; polymerization degree: 732; average particle size: 55 μm; water content: 7%).

Example 1

Step (I): Cationization Reaction

A 1-L kneader "PNV-1 Model" (available from Irie Shokai Co., Ltd.) equipped with a reflux tube was charged with 100 g of the low-crystalline powdery cellulose (crystallinity index number: −0.20; polymerization degree: 740; average particle size: 52 μm; water content: 1%) obtained in Production Example 2, and then 10.2 g of a 48% sodium hydroxide aqueous solution (NaOH content: 0.12 mol) were added dropwise thereto, and the contents of the kneader were stirred in a nitrogen atmosphere for 3 h. Thereafter, the kneader was heated to 70° C. by a warm water, and then 33.5 g of an aqueous solution of glycidyl trimethyl ammonium chloride (hereinafter referred to merely as "GMAC"; available from Sakamoto Yakuhin Kogyo Co., Ltd.; water content: 20%; purity: 90% or more) as a cationizing agent whose water content was adjusted to 38.5% were added dropwise thereinto over 2 h. The water content in the reaction system was 19.5% on the basis of the raw cellulose [the value as calculated from the raw material initially charged (hereinafter referred to merely as a "calculated value"): 19.4%]. Then, the contents of the kneader were further stirred at 70° C. for 3 h. As a result of analysis by high-pressure liquid chromatography (HPLC), it was confirmed that a whole amount of the cationizing agent added was consumed.

Step (II): Hydroxypropylation Reaction (First Reaction)

Next, while heating the reaction system at 70° C., 88.6 g of propylene oxide (1.53 mol; available from Kanto Chemical Co., Inc.; guaranteed reagent) were added dropwise thereto, and the contents in the kneader were reacted for 25 h until the propylene oxide added was consumed and the reflux was terminated. The water content in the reaction system before adding dropwise the propylene oxide thereto was 19.5% on the basis of the raw cellulose. Thereafter, the obtained reaction product was taken out from the kneader, thereby obtaining 215 g of a light brown cationic hydroxypropyl cellulose powder. The thus obtained final reaction product was sampled in an amount of 10.0 g and neutralized with acetic acid, thereby obtaining a light brown solid. The resulting product was purified by passing through a dialysis membrane (cutoff molecular weight: 1000), and then its aqueous solution was freeze-dried to obtain a purified cationic hydroxypropyl cellulose.

As a result of subjecting the thus purified product to elemental analysis, it was confirmed that the chlorine element content therein was 2.00%. Further, as a result of analyzing the product by the method for analysis of hydroxypropyl cellulose, it was confirmed that the content of a propyleneoxy group [molecular weight ($C_3H_6O$): 58.08] therein was 46.4%. Furthermore, it was confirmed that the substitution degrees of the cationic group and the propyleneoxy group were 0.16 and 1.80, respectively; the reaction selectivity to the cellulose was 80% (based on the cationizing agent) and 72% (based on the propylene oxide); and the water soluble content of the resulting C-HPC was 67%.

Step (II): Hydroxypropylation Reaction (Second Reaction)

Next, 200 g of the cationic hydroxypropyl cellulose powder (unneutralized and unpurified) obtained in the above hydroxypropylation reaction (first reaction) were heated again to 70° C., and then 27.0 g of propylene oxide (0.47 mol; available from Kanto Chemical Co., Inc.; guaranteed reagent) were added dropwise thereto, and further the contents of the kneader were reacted for 5 h until the propylene oxide added was consumed and the reflux was terminated. The water content in the reaction system before adding dropwise the propylene oxide thereto was 19.0% on the basis of the raw cellulose. Thereafter, the obtained reaction product was taken out from the kneader, thereby obtaining 222 g of a light brown cationic hydroxypropyl cellulose powder.

The resulting product was purified by passing through a dialysis membrane (cutoff molecular weight: 1000), and then its aqueous solution was freeze-dried to obtain a purified C-HPC. As a result of subjecting the thus purified product to elemental analysis, it was confirmed that the chlorine element content therein was 1.80%. Further, as a result of analyzing the product by the method for analysis of hydroxypropyl cellulose, it was confirmed that the content of a propyleneoxy group therein was 54.0%. Furthermore, it was confirmed that the substitution degrees of the cationic group and the propyleneoxy group were 0.16 and 2.30, respectively; the reaction selectivity to the cellulose was 80% (based on the cationizing agent) and 70% (based on the propylene oxide); and the water soluble content of the resulting C-HPC was 70%. The results are shown in Table 1.

Example 2

Step (I): Cationization Reaction

The cationization reaction was carried out in the same manner as in Example 1 except for using 54.2 g of an aqueous solution of GMAC whose water content was adjusted to 81% as a cationizing agent. As a result of subjecting the resulting product to HPLC analysis, it was confirmed that a whole amount of the cationizing agent was completely consumed. Further, it was confirmed that the water content in the reaction system after adding dropwise the GMAC aqueous solution was 50.0% (calculated value: 50.7%) on the basis of the raw cellulose.

Step (II): Hydroxypropylation Reaction (First Reaction)

Next, while heating the reaction system at 70° C., 106.3 g (1.83 mol) of propylene oxide were added dropwise thereto, and the contents in the kneader were reacted for 16 h until the propylene oxide added was consumed and the reflux was terminated. The water content in the reaction system before adding dropwise the propylene oxide thereto was 50.0% on the basis of the raw cellulose. Thereafter, the obtained reaction product was taken out from the kneader, thereby obtaining 239 g of a light brown cationic hydroxypropyl cellulose powder. The thus obtained final reaction product was sampled in an amount of 10.0 g and neutralized with acetic acid, thereby obtaining a light brown solid. The resulting product was purified by passing through a dialysis membrane (cutoff molecular weight: 1000), and then its aqueous solution was freeze-dried to obtain a purified C-HPC. As a result of subjecting the thus purified product to elemental analysis, it was confirmed that the chlorine element content therein was 0.90%. Further, as a result of analyzing the product by the method for analysis of hydroxypropyl cellulose, it was confirmed that the content of a propyleneoxy group therein was 43.5%. Furthermore, it was confirmed that the substitution degrees of the cationic group and the propyleneoxy group were 0.07 and 1.50, respectively; the reaction selectivity to the cellulose was 70% (based on the cationizing agent) and 50% (based on the propylene oxide); and the water soluble content of the resulting C-HPC was 36%.

Step (II): Hydroxypropylation Reaction (Second Reaction)

Next, 229 g of the cationic hydroxypropyl cellulose powder (unneutralized and unpurified) obtained in the above hydroxypropylation reaction (first reaction) in Example 2 were heated again to 70° C., and then 68.0 g (1.17 mol) of propylene oxide were added dropwise thereto, and further the contents of the kneader were reacted for 12 h until the propylene oxide added was consumed and the reflux was terminated. The water content in the reaction system before adding dropwise the propylene oxide thereto was 45.0% on the basis of the raw cellulose. Thereafter, the obtained reaction product was taken out from the kneader, thereby obtaining 283 g of a light brown cationic hydroxypropyl cellulose powder. The resulting product was purified by passing through a dialysis membrane (cutoff molecular weight: 1000), and then its aqueous solution was freeze-dried to obtain a purified C-HPC. As a result of subjecting the thus purified product to elemental analysis, it was confirmed that the chlorine element content therein was 0.72%. Further, as a result of analyzing the product by the method for analysis of hydroxypropyl cellulose, it was confirmed that the content of a propyleneoxy group therein was 54.6%. Furthermore, it was confirmed that the substitution degrees of the cationic group and the propyleneoxy group were 0.07 and 2.15, respectively; the reaction selectivity to the cellulose was 70% (based on the cationizing agent) and 43% (based on the propylene oxide); and the water soluble content of the resulting C-HPC was 39%. The results are shown in Table 1.

Example 3

Step (I): Cationization Reaction

The cationization reaction was carried out in the same manner as in Example 1 except for using 18.7 g of an aqueous solution of GMAC whose water content was adjusted to 45% as a cationizing agent. As a result of subjecting the resulting product to HPLC analysis, it was confirmed that a whole amount of the cationizing agent was completely consumed. Further, it was confirmed that the water content in the reaction system after adding dropwise the GMAC aqueous solution was 15.0% (calculated value: 14.9%) on the basis of the raw cellulose.

Step (II): Hydroxypropylation Reaction

Next, while heating the reaction system at 70° C., 106.3 g (1.83 mol) of propylene oxide were added dropwise thereto, and the contents in the kneader were reacted for 23 h until the propylene oxide added was consumed and the reflux was terminated. The water content in the reaction system before adding dropwise the propylene oxide thereto was 15.0% on the basis of the raw cellulose. Thereafter, the obtained reaction product was neutralized with acetic acid, thereby obtaining a light brown solid. The resulting product was purified by passing through a dialysis membrane (cutoff molecular weight: 1000), and then its aqueous solution was freeze-dried to obtain a purified C-HPC. As a result of subjecting the thus purified product to elemental analysis, it was confirmed that the chlorine element content therein was 1.00%. Further, as a result of analyzing the product by the method for analysis of hydroxypropyl cellulose, it was confirmed that the content of a propyleneoxy group therein was 54.6%. Furthermore, it was confirmed that the substitution degrees of the cationic group and the propyleneoxy group were 0.09 and 2.20, respectively; the reaction selectivity to the cellulose was 90% (based on the cationizing agent) and 73% (based on the propylene oxide); and the water soluble content of the resulting C-HPC was 57%. The results are shown in Table 1.

Example 4

Step (I): Cationization Reaction

The cationization reaction was carried out in the same manner as in Example 1 except for using 16.6 g of an aqueous solution of GMAC whose water content was adjusted to 38% as a cationizing agent. As a result of subjecting the resulting product to HPLC analysis, it was confirmed that a whole amount of the cationizing agent was completely consumed. Further, it was confirmed that the water content in the reaction system after adding dropwise the GMAC aqueous solution was 12.5% (calculated value: 12.7%) on the basis of the raw cellulose.

Step (II): Hydroxypropylation Reaction

Next, while heating the reaction system at 70° C., 106.3 g (1.83 mol) of propylene oxide were added dropwise thereto, and the contents in the kneader were reacted for 18 h until the propylene oxide added was consumed and the reflux was terminated. The water content in the reaction system before adding dropwise the propylene oxide thereto was 12.5% on the basis of the raw cellulose. Thereafter, the obtained reaction product was neutralized with acetic acid, thereby obtaining a light brown solid. The resulting product was purified by passing through a dialysis membrane (cutoff molecular weight: 1000), and then its aqueous solution was freeze-dried to obtain a purified C-HPC. As a result of subjecting the thus purified product to elemental analysis, it was confirmed that the chlorine element content therein was 1.00%. Further, as a result of analyzing the product by the method for analysis of hydroxypropyl cellulose, it was confirmed that the content of a propyleneoxy group therein was 58.5%. Furthermore, it was confirmed that the substitution degrees of the cationic group and the propyleneoxy group were 0.09 and 2.50, respectively; the reaction selectivity to the cellulose was 80% (based on the cationizing agent) and 83% (based on the propylene oxide); and the water soluble content of the resulting C-HPC was 60%. The results are shown in Table 1.

Example 5

Step (I): Hydroxypropylation Reaction

A 1-L kneader "PNV-1 Model" (available from Irie Shokai Co., Ltd.) equipped with a reflux tube was charged with 100 g of the low-crystalline powdery cellulose (crystallinity index number: −0.15; polymerization degree: 556; average particle size: 30 μm; water content: 7%) obtained in the above Production Example 1, and then 9.6 g of a 48% sodium hydroxide aqueous solution (NaOH content: 0.11 mol) were added dropwise thereto. Further, 4.7 g of tert-butyl alcohol (5% based on cellulose; available from Kanto Chemical Co., Inc.; guaranteed reagent) were added to the kneader, and the contents of the kneader were stirred in a nitrogen atmosphere for 2 h. Thereafter, the kneader was heated to 70° C. by a warm water, and then 83 g (1.43 mol) of propylene oxide were added dropwise thereto, and the contents in the kneader were reacted for 20 h until the propylene oxide added was consumed and the reflux was terminated. The water content in the reaction system was 12.9% on the basis of the raw cellulose as the calculated value based on the amount of the raw material charged.

Step Cationization Reaction

Next, 33.5 g of the GMAC aqueous solution used in Example 1 as a cationizing agent (water content: 38.5%) were added dropwise into the above prepared hydroxypropyl cellulose over 2 h. The water content in the reaction system after adding dropwise the GMAC aqueous solution was 26.8% on the basis of the raw cellulose as the calculated value based on the amount of the raw material charged. Then, the contents of the kneader were further stirred at 70° C. for 3 h. As a result of analyzing the reaction solution by high-pressure liquid chromatography (HPLC), it was confirmed that a whole amount of the cationizing agent was consumed. Thereafter, the obtained reaction product was neutralized with acetic acid, thereby obtaining a light brown solid. The resulting product was purified by passing through a dialysis membrane (cutoff molecular weight: 1000), and then its aqueous solution was freeze-dried to obtain a purified C-HPC. As a result of subjecting the thus purified product to elemental analysis, it was confirmed that the chlorine element content therein was 0.65%. Further, as a result of analyzing the product by the method for analysis of hydroxypropyl cellulose, it was confirmed that the content of a propyleneoxy group therein was 57.0%. Furthermore, it was confirmed that the substitution degrees of the cationic group and the propyleneoxy group were 0.06 and 2.3, respectively; the reaction selectivity to the cellulose was 16% (based on the cationizing agent) and 92% (based on the propylene oxide); and the water soluble content of the resulting C-HPC was 70%. The results are shown in Table 1.

Comparative Example 1

Step (I): Cationization Reaction

The cationization reaction was carried out in the same manner as in Example 1 except for using 93.6 g of an aqueous solution of GMAC whose water content was adjusted to 78% as a cationizing agent. As a result of subjecting the resulting product to HPLC analysis, it was confirmed that a whole amount of the cationizing agent was completely consumed. Further, it was confirmed that the water content in the reaction system after adding dropwise the GMAC aqueous solution was 80.0% (calculated value: 80.1%) on the basis of the raw cellulose.

Step (II): Hydroxypropylation Reaction

Next, while heating the reaction system at 70° C., 212.7 g (3.67 mol) of propylene oxide were added dropwise thereto, and the contents in the kneader were reacted for 12 h until the propylene oxide added was consumed and the reflux was terminated. The water content in the reaction system before adding dropwise the propylene oxide thereto was 80.0% on the basis of the raw cellulose. Thereafter, the obtained reaction product was neutralized with acetic acid, thereby obtaining a light brown solid. The resulting product was purified by passing through a dialysis membrane (cutoff molecular weight: 1000), and then its aqueous solution was freeze-dried to obtain a purified C-HPC. As a result of subjecting the thus purified product to elemental analysis, it was confirmed that the chlorine element content therein was 0.30%. Further, as a result of analyzing the product by the method for analysis of hydroxypropyl cellulose, it was confirmed that the content of a propyleneoxy group therein was 45.6%. Furthermore, it was confirmed that the substitution degrees of the cationic group and the propyleneoxy group were 0.02 and 1.55, respectively; the reaction selectivity to the cellulose was 10% (based on the cationizing agent) and 24% (based on the propylene oxide); and the water soluble content of the resulting C-HPC was 20%. The results are shown in Table 1.

Step (II): Hydroxypropylation Reaction

Next, while heating the reaction system at 70° C., 17.7 g (0.31 mol) of propylene oxide were added dropwise thereto, and the contents in the kneader were reacted for 12 h under reflux. The water content in the reaction system before adding dropwise the propylene oxide thereto was 9.0% on the basis of the raw cellulose. Although the reflux was not terminated even after 12 h, the reaction mixture was cooled to room temperature and then neutralized with acetic acid, thereby obtaining a light brown solid. The resulting product was purified by passing through a dialysis membrane (cutoff molecular weight: 1000), and then its aqueous solution was freeze-dried to obtain a white cellulose solid. As a result of subjecting the thus obtained product to elemental analysis, it was confirmed that the chlorine element content therein was 1.80%. Further, as a result of analyzing the product by the method for analysis of hydroxypropyl cellulose, it was confirmed that the content of a propyleneoxy group therein was 1.0%. Furthermore, it was confirmed that the substitution degrees of the cationic group and the propyleneoxy group were 0.09 and 0.02, respectively; the reaction selectivity to the cellulose was 90% (based on the cationizing agent) and 2% (based on the propylene oxide); and the water soluble content of the resulting C-HPC was 10%. The results are shown in Table 1.

TABLE 1

|  |  | Examples | | | | | Comparative Examples | |
| --- | --- | --- | --- | --- | --- | --- | --- | --- |
|  |  | 1 | 2 | 3 | 4 | 5 | 1 | 2 |
| Cationization | Water content in reaction system (mass % based on cellulose) | 19.5 | 19.5 | 50.0 | 50.0 | 15.0 | 12.5 | 26.8*[3] | 80.0 | 9.0 |
|  | Cationizing agent*[1] | 0.20 | 0.20 | 0.10 | 0.10 | 0.10 | 0.10 | 0.38 | 0.20 | 0.10 |
| Hydroxypropylation | Water content in reaction system (mass % based on cellulose) | 19.5 | 19.0 | 50.0 | 45.0 | 15.0 | 12.5 | 12.9*[3] | 80.0 | 9.0 |
|  | Propylene oxide*[2] | 2.50 | 3.29 | 3.00 | 5.00 | 3.00 | 3.00 | 2.50 | 6.46 | 1.00 |
| Substitution degree | Cationic group | 0.16 | 0.16 | 0.07 | 0.07 | 0.09 | 0.09 | 0.06 | 0.02 | 0.09 |
|  | Propyleneoxy group | 1.80 | 2.30 | 1.50 | 2.15 | 2.20 | 2.50 | 2.30 | 1.55 | 0.02 |
| Reaction selectivity (%) | Based on cationizing agent | 80 | 80 | 70 | 70 | 90 | 80 | 16 | 10 | 90 |
|  | Based on propylene oxide | 72 | 70 | 50 | 43 | 73 | 83 | 92 | 24 | 2 |
| Water soluble content (%) |  | 67 | 70 | 36 | 39 | 57 | 60 | 70 | 20 | 10 |

Note

*[1]Molar amount of a cationizing agent per 1 mol of a constitutional anhydroglucose unit (AGU) in a cellulose molecule (calculated as a purity of 90%).
*[2]Molar amount of propylene oxide per 1 mol of a constitutional anhydroglucose unit (AGU) in a cellulose molecule.
*[3]Calculated value on the basis of an amount of the raw material charged.

Comparative Example 2

Step (I): Cationization Reaction

The cationization reaction was carried out in the same manner as in Example 1 except for using 12.9 g of GMAC (water content: 20%) as a cationizing agent. As a result of subjecting the resulting product to HPLC analysis, it was confirmed that a whole amount of the cationizing agent was completely consumed. Further, it was confirmed that the water content in the reaction system after adding dropwise the GMAC aqueous solution was 9.0% (calculated value: 9.0%) on the basis of the raw cellulose.

From Table 1, it was confirmed that the cationic hydroxypropyl celluloses obtained in Examples 1 to 5 had a high water soluble content, and both a cationic group and a hydroxypropyl group were introduced thereinto in an amount sufficient to exhibit a performance thereof, as compared to those obtained in Comparative Examples 1 and 2. Therefore, the cationic hydroxypropyl cellulose obtained according to the present invention can be suitably used as components to be compounded in cleaning agent compositions such as shampoos, rinses, treatments and conditioners, and as dispersants, modifiers and aggregating agents, etc.

In the following Examples 6 and 7 and Comparative Example 3, for the purpose of evaluating an influence of the water content upon the reaction on the hydroxypropylation reaction rate, the hydroxypropylation reaction was carried out in a hermetically sealed reaction apparatus with various reaction systems whose water contents upon the reaction were different from each other, to measure the time required until the propylene oxide was consumed and the pressure within the reaction system reached 0.01 MPa.

Example 6

Step (I): Cationization Reaction

The cationization reaction was carried out in the same manner as in Example 1 except for using 100 g of the low-crystalline powdery cellulose (crystallinity index number: 0; polymerization degree: 730; average particle size: 55 μm; water content: 7%) obtained in the above Production Example 3 as the raw cellulose, 9.3 g of a 48% sodium hydroxide aqueous solution (NaOH content: 0.11 mol) as the catalyst, and 27.3 g of an aqueous solution of GMAC whose water content was adjusted to 30% as the cationizing agent. As a result of subjecting the resulting product to HPLC analysis, it was confirmed that a whole amount of the cationizing agent was completely consumed. Further, it was confirmed that the water content in the reaction system after adding dropwise the GMAC aqueous solution was 21.8% (calculated value: 21.5%) on the basis of the raw cellulose.

Step (II): Hydroxypropylation Reaction

A hermetically sealed reaction apparatus (a 1.5 L autoclave available from Nitto Koatsu Co., Ltd.) was charged with 120.0 g of the cationic cellulose (water content based on cellulose: 21.8%) obtained in the above reaction, and an inside atmosphere of the reaction apparatus was replaced with nitrogen. Then, 14.6 g (0.25 mol) of propylene oxide were charged into the reaction apparatus, and the contents of the reaction apparatus were heated to 70° C. while stirring, so that an inside pressure of the reaction apparatus was raised to 0.22 MPa. Thereafter, it took 1.5 h until the inside pressure of the reaction apparatus was decreased to 0.01 MPa or less. After cooling the reaction system to room temperature, 14.6 g (0.25 mol) of propylene oxide were charged again into the reaction apparatus, and the contents of the reaction apparatus were heated to 70° C. while stirring, so that the inside pressure of the reaction apparatus was raised to 0.20 MPa. Thereafter, it took 1.3 h until the inside pressure of the reaction apparatus was decreased to 0.01 MPa or less. From these results, it was confirmed that the time required for consuming the propylene oxide in a total amount of 29.2 g (0.50 mol) was 2.8 h. Then, 173.3 g (yield: 99.6%) of the obtained product in the form of a light brown solid were withdrawn from the reaction apparatus. The resulting product was purified by passing through a dialysis membrane (cutoff molecular weight: 1000), and then its aqueous solution was freeze-dried to obtain a purified C-HPC. As a result of subjecting the thus purified product to elemental analysis, it was confirmed that the chlorine element content therein was 2.4%. Further, as a result of analyzing the product by the method for analysis of hydroxypropyl cellulose, it was confirmed that the content of a propyleneoxy group therein was 28.0%. Furthermore, it was confirmed that the substitution degrees of the cationic group and the propyleneoxy group were 0.16 and 0.89, respectively; and the reaction selectivity to the cellulose was 80% (based on the cationizing agent) and 89% (based on the propylene oxide). The results are shown in Table 2.

Example 7

Step (I): Cationization Reaction

The cationization reaction was carried out in the same manner as in Example 6 except for using 60.0 g of an aqueous solution of GMAC whose water content was adjusted to 67% as the cationizing agent. As a result of subjecting the resulting product to HPLC analysis, it was confirmed that a whole amount of the cationizing agent was completely consumed. Further, it was confirmed that the water content in the reaction system after adding dropwise the GMAC aqueous solution was 58.8% (calculated value: 56.0%) on the basis of the raw cellulose.

Step (II): Hydroxypropylation Reaction

Next, a hermetically sealed reaction apparatus (a 1.5 L autoclave available from Nitto Koatsu Co., Ltd.) was charged with 160.0 g of the cationic cellulose (water content based on cellulose: 58.2%) obtained in the above reaction, and an inside atmosphere of the reaction apparatus was replaced with nitrogen. Then, 15.5 g (0.27 mol) of propylene oxide were charged into the reaction apparatus, and the contents of the reaction apparatus were heated to 70° C. while stirring, so that an inside pressure of the reaction apparatus was raised to 0.13 MPa. Thereafter, it took 0.8 h until the inside pressure of the reaction apparatus was decreased to 0.01 MPa or less. After cooling the reaction system to room temperature, 15.5 g (0.27 mol) of propylene oxide were charged again into the reaction apparatus, and the contents of the reaction apparatus were heated to 70° C. while stirring, so that the inside pressure of the reaction apparatus was raised to 0.13 MPa. Thereafter, it took 0.6 h until the inside pressure of the reaction apparatus was decreased to 0.01 MPa or less. From these results, it was confirmed that the time required for consuming the propylene oxide in a total amount of 31.0 g (0.54 mol) was 1.4 h. Then, 181.5 g (yield: 99.5%) of the obtained product in the form of a light brown solid were withdrawn from the reaction apparatus. The resulting product was purified by passing through a dialysis membrane (cutoff molecular weight: 1000), and then its aqueous solution was freeze-dried to obtain a purified C-HPC. As a result of subjecting the thus purified product to elemental analysis, it was confirmed that the chlorine element content therein was 1.0%. Further, as a result of analyzing the product by the method for analysis of hydroxypropyl cellulose, it was confirmed that the content of a propyleneoxy group therein was 23.5%. Furthermore, it was confirmed that the substitution degrees of the cationic group and the propyleneoxy group were 0.06 and 0.65, respectively; and the reaction selectivity to the cellulose was 30% (based on the cationizing agent) and 65% (based on the propylene oxide). The results are shown in Table 2.

Comparative Example 3

The cationization reaction was carried out in the same manner as in Comparative Example 2.

Next, a hermetically sealed reaction apparatus (a 1.5 L autoclave available from Nitto Koatsu Co., Ltd.) was charged with 120.0 g of the cationic cellulose (water content based on cellulose: 9.0%) obtained in the above reaction, and an inside atmosphere of the reaction apparatus was replaced with nitrogen. Then, 17.3 g (0.30 mol) of propylene oxide were charged into the reaction apparatus, and the contents of the reaction apparatus were heated to 70° C. while stirring, so that an inside pressure of the reaction apparatus was raised to 0.25 MPa. Thereafter, although stirring the reaction system at 70° C. for 3 h, no decrease in inside pressure of the reaction apparatus was observed, and therefore no reaction of the propylene oxide was caused to proceed. After cooling the reaction system to room temperature, the obtained reaction mixture was neutralized with acetic acid, thereby obtaining a light brown solid. The resulting product was purified by passing through a dialysis membrane (cutoff molecular weight: 1000), and then its aqueous solution was freeze-dried to obtain a white cellulose solid. As a result of subjecting the thus obtained product to elemental analysis, it was confirmed that the chlorine element content therein was 1.90%. Further, as a result of analyzing the product by the method for analysis of hydroxypropyl cellulose, it was confirmed that the content of a propyleneoxy group therein was below the detection limit. Furthermore, it was confirmed that the substitution degrees of the cationic group and the propyleneoxy group were 0.09 and 0.01 or less, respectively; and the reaction selectivity to the cellulose was 90% (based on the cationizing agent) and 1% or less (based on the propylene oxide). The results are shown in Table 2.

TABLE 2

|  |  | Examples | | Comparative. Example. |
| --- | --- | --- | --- | --- |
|  |  | 6 | 7 | 3 |
| Cationization | Water content in reaction system (mass % based on cellulose) | 21.8 | 58.2 | 9.0 |
|  | Cationizing agent*1 | 0.20 | 0.19 | 0.10 |
| Hydroxypropylation | Water content in reaction system (mass % based on cellulose) | 21.8 | 58.2 | 9.0 |
|  | Propylene oxide*2 | 1.00 | 1.00 | 1.00 |
|  | Initial pressure within reaction system (MPa) | 0.22 | 0.13 | 0.25 |
|  | Reaction time (h)*3 | 2.8 | 1.4 | —*4 |
| Substitution degree | Cationic group | 0.16 | 0.06 | 0.09 |
|  | Propyleneoxy group | 0.89 | 0.65 | <0.01 |
| Reaction selectivity (%) | Based on cationizing agent | 80 | 30 | 90 |
|  | Based on propylene oxide | 89 | 65 | <1 |

Note
*1: Molar amount of a cationizing agent per 1 mol of a constitutional anhydroglucose unit (AGU) in a cellulose molecule.
*2: Molar amount of propylene oxide per 1 mol of a constitutional anhydroglucose unit (AGU) in a cellulose molecule.
*3: Time required until propylene oxide was consumed and the pressure within the reaction system reached 0.01 MPa.
*4: Even after the elapse of 3 h from initiation of the reaction, no decrease in pressure was observed, and therefore the reaction was stopped.

From the comparison of Examples 6 and 7 with Comparative Example 3, it was confirmed that when the reaction is carried out by controlling the water content in such a specific range as defined by the present invention, it is possible to allow the reaction to proceed rapidly.

The invention claimed is:

1. A process for producing a cationic hydroxypropyl cellulose, comprising:
i) reacting a low-crystalline powdery cellulose with at least one member selected from the group consisting of a cationizing agent represented by general formula (1) and a cationizing agent represented by general formula (2):

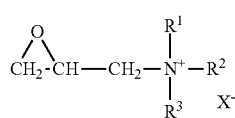

General formula (1)

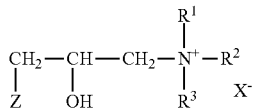

General formula (2)

wherein $R^1$ to $R^3$ are each independently a linear or branched hydrocarbon group having 1 to 4 carbon atoms; and X and Z are each a halogen atom and may be the same or different from each other,
in the presence of a catalyst and a liquid consisting of water and non-aqueous solvent, wherein said water is present in an amount of from 10 to 30% by mass on the basis of the low-crystalline powdery cellulose, and said non-aqueous solvent is present in an amount of 0 to 40% by mass on the basis of the low-crystalline powdery cellulose,
to obtain a cationic cellulose; and then
ii) reacting the thus obtained cationic cellulose with propylene oxide in the presence of a catalyst and a liquid consisting of water and non-aqueous solvent, wherein said water is present in an amount of from 10 to 30% by mass on the basis of the low-crystalline powdery cellulose, and said non-aqueous solvent is present in an amount of 0 to 40% by mass on the basis of the low-crystalline powdery cellulose.

2. The process for producing a cationic hydroxypropyl cellulose according to claim 1, wherein an average molar number of addition of a quaternary ammonium salt-substituted propyleneoxy group which is introduced into the low-crystalline powdery cellulose per 1 mol of a constitutional anhydroglucose unit present in a main chain of the cellulose is from 0.01 to 2.5, and an average molar number of addition of a propyleneoxy group which is introduced into the cationic cellulose per 1 mol of a constitutional anhydroglucose unit present in a main chain of the cellulose is from 0.1 to 5.

3. The process for producing a cationic hydroxypropyl cellulose according to claim 1, wherein the catalyst is a base catalyst.

4. The process for producing a cationic hydroxypropyl cellulose according to claim 1, wherein a crystallinity index number of the low-crystalline powdery cellulose is in the range of from −0.3 to 0.5.

5. The process for producing a cationic hydroxypropyl cellulose according to claim 1, wherein the low-crystalline powdery cellulose is obtained by treating chip-like pulps obtained by coarsely crushing sheet-like cellulose pulps by an extruder and further by a mill.

6. The process for producing a cationic hydroxypropyl cellulose according to claim 5, wherein the mill is selected from the group consisting of a vibration ball mill, a medium-stirring mill, a rolling ball mill, a planetary ball mill and a rod mill.

7. The process for producing a cationic hydroxypropyl cellulose according to claim 1, wherein the cationizing agent is present during said i) reacting in an amount of from 0.01 to 10 mol per 1 mol of a constitutional anhydroglucose unit present in a molecule of the low-crystalline powdery cellulose.

8. The process for producing a cationic hydroxypropyl cellulose according to claim 1, wherein the catalyst of said i) reacting is present during the reaction in an amount of from 0.1 to 50 mol % on the basis of a constitutional anhydroglucose unit present in a molecule of the low-crystalline powdery cellulose.

9. The process for producing a cationic hydroxypropyl cellulose according to claim 1, wherein said i) reacting is carried out at a temperature of from 0 to 100° C.

10. The process for producing a cationic hydroxypropyl cellulose according to claim 1, wherein said i) reacting is carried out in the presence of water, which is present in an amount of from 15 to 30% by mass on the basis of the low-crystalline powdery cellulose.

11. The process for producing a cationic hydroxypropyl cellulose according to claim 1, wherein the propylene oxide is present during said ii) reacting in an amount of from 0.1 to 12 mol per 1 mol of a constitutional anhydroglucose unit present in a molecule of the cationic cellulose.

12. The process for producing a cationic hydroxypropyl cellulose according to claim 1, wherein the catalyst of said ii) reacting is present during the reaction in an amount of from 0.1 to 50 mol % on the basis of a constitutional anhydroglucose unit present in a molecule of the cationic cellulose.

13. The process for producing a cationic hydroxypropyl cellulose according to claim 1, wherein said ii) reacting is carried out at a temperature of from 0 to 100° C.

14. The process for producing a cationic hydroxypropyl cellulose according to claim 1, wherein said ii) reacting is carried out in the presence of water, which is present in an amount of from 15 to 30% by mass on the basis of the low-crystalline powdery cellulose present in the reaction with the cationizing agent.

* * * * *